United States Patent

Schmoyer

[15] 3,693,493
[45] Sept. 26, 1972

[54] LIGHT BAR INDICATOR FOR KEYBOARD TEACHING DEVICES

[72] Inventor: Arthur R. Schmoyer, 11708 River Road, Potomac, Md. 20854

[22] Filed: June 23, 1971

[21] Appl. No.: 155,787

Related U.S. Application Data

[62] Division of Ser. No. 151,729, June 10, 1971.

[52] U.S. Cl. ................................................. 84/479
[51] Int. Cl. ............................................. G09b 15/08
[58] Field of Search .......................... 84/477–482

[56] References Cited

UNITED STATES PATENTS 1,844,976   2/1932   Rantz .......................... 84/478
2,746,339   5/1956   Schmidt ...................... 84/478
3,335,630   8/1967   Schmoyer .................... 84/478

Primary Examiner—Richard B. Wilkinson
Assistant Examiner—Lawrence R. Franklin
Attorney—Smith, Michael, Bradford & Gardiner

[57] ABSTRACT

An instructional indicator for placement on a keyboard includes lights individually focused on the surface of the keys.

2 Claims, 3 Drawing Figures

PATENTED SEP 26 1972 3,693,493

INVENTOR
Arthur R. Schmoyer

BY Smith, Michael, Bradford & Gardwin

ATTORNEYS 3,693,493

LIGHT BAR INDICATOR FOR KEYBOARD TEACHING DEVICES

RELATED APPLICATION

This application is a division of my application Ser. No. 151,729, filed June 10, 1971 and entitled "Programmed Audio-Visual Presentation of Information for Instruction in the Operation of Keyboard Controlled Instruments."

ENVIRONMENT OF INVENTION

This invention finds application in the field of visible displays for teaching the operation of a keyboard controlled instrument, particularly a piano or organ.

BACKGROUND OF INVENTION - PRIOR ART

Apparatus is known where a plurality of indicator lights are placed in close proximity to the keys of a keyboard and are selectively illuminated, generally in synchronism with audible instructions, in order to attract a student's attention to the location of particular keys. Such devices are disclosed in my U.S. Pats. Nos. 3,335,630, issued Aug. 15, 1967, 3,353,435 issued Nov. 21, 1967 and 3,377,716 issued April 16, 1968, as well as in U.S. Pats., to others, such as McAleavey Nos. 1,613,400 issued Jan. 4, 1927, Decker 3,482,480 issued Dec. 9, 1969 and Schmidt 2,746,339, issued May 22, 1956. Additionally, it is known to modify the keys themselves so as to carry lights within the keys which cause a translucent key surface to glow through illumination of the underside of the surface, and to build lights into the key surface where they are directly visible.

OBJECTS OF INVENTION

The apparatus of the aforedescribed prior art suffers from either of two deficiencies. The light bars referred to in the patents enumerated above may be constructed as a separate and distinct entity from the keyboard itself, but create a visible signal which is distractingly distinct in appearance from the appearance of the keyboard surface to which the student should become accustomed. Indeed, this is the very purpose of any such instruction. On the other hand, those devices referred to as additionally known prior art require modification of the key structure and thus must be built into the instrument structure as a permanent fixture.

It is among the purpose of this invention to combine the attributes of the foregoing and to provide a light bar for keyboard teaching devices in which:

1. the light bar is independent of the keyboard structure and free of attachment thereto,
2. the underside of the light bar is keyed to register with the raised (black) keys of the keyboard when placed thereon,
3. the light indicators are positioned to project light on the key surfaces,
4. each indicator overlying a black key is set back to confine the projected light rays to its respective key surface, and
5. the indication appears to the student as a natural key surface standing out from other keys by illumination thereof.

DESCRIPTION OF DRAWings

The foregoing, and other self-evident purposes and advantages of this invention will be better understood by a consideration of the ensuing specifications and accompanying drawings, in which.

DESCRIPTION OF INVENTION

Figure 3:
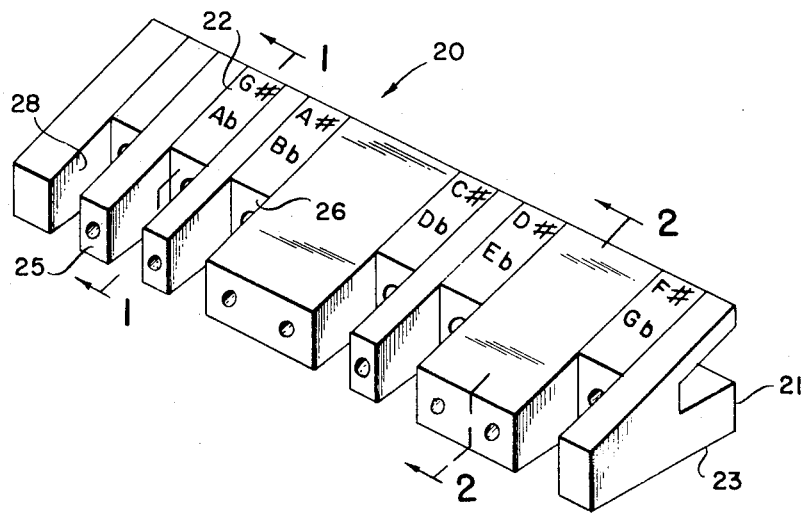
FIG. 3 is a perspective view of a light bar construction in accordance with the invention.

Referring to FIG. 3, the light bar of this invention, generally indicated at 20, is seen to comprise an elongated block 21 comprising an upper surface 22 on which appears indicia appropriate to the identity of the keys over which the light bar is to be placed. The bottom surface of the block 21 is configured to key the light bar to proper placement on the keyboard. To this end, those portions of the bar overlying the white keys have a bottom surface 23 lying in a first plane while those portions overlying a black key have a bottom portion 24 on a plane elevated from the first plane to accommodate the elevated touch surface of the black keys. Considering the pattern of a normal keyboard wherein black keys alternate with white keys on a definite pattern which reoccurs in succeeding octaves only, it can be seen that the light bar will fit in only one position within the span of an octave and, once in place will be retained in this properly indexed position without the need of fasteners or other retaining means.

Figure 1:
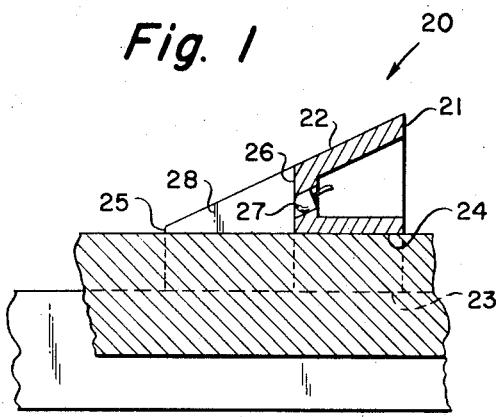
FIG. 1 is a cross section of a light bar taken on section 1—1 of FIG. 3.
Figure 2:
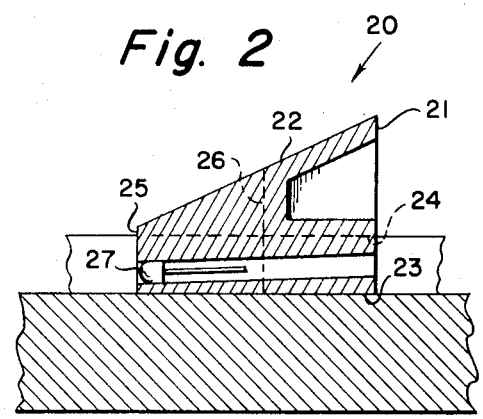
FIG. 2 is a cross section of a light bar taken of section 2—2 of FIG. 3.

The light bar further includes front surfaces 25, 26, etc. overlying each individual key, the surfaces 26 which overlie black keys being set back from the surfaces 25 which overlie white keys. Referring particularly to FIGS. 1 and 2, it is evident that the upper surface 22 slopes at an angle to the horizontal such that the intersection with the front surfaces 25 are at a first elevation and the intersection with the surfaces 26 are at a higher elevation, the difference in elevation approximating the difference in elevation of the top surfaces of the black keys and the white keys whereby the front surfaces 25 are of approximately the same surface area as the front surfaces 26.

Each of the front surfaces 25, 26 which overlies a significant key, i.e., a key which figures in the instructional program, has disposed therein a light 27 set back slightly from the surface 25 or 26 so as to be visible to the student only indirectly, and is directed downwardly so as to project a light beam on the surface of the corresponding individual key. By appropriate choice of the lamp, the use of light piping (not shown) or an optical lense system (not shown) and by appropriate set back of the lamp from the front surface 25 or 26, the projected light may be confined or at least concentrated within the bounds of the surface of its respective key. Note also that the setback of the front surfaces 26 overlying black keys provides transition areas comprising side walls 28 which with portion 26 define therebetween a pocket overlying the black key in which the light is confined to the black keys bordered thereby and that the aforementioned uniformity of respective surface areas 25 and 26 places the lamps in similar relationship to the key surfaces of both white and black keys, despite differences in the elevation of the key surfaces.

By thus providing an indicator which is only indirectly visible to the student, and which exhibits this visibility primarily on the surface of the key, the visual stimulus is presented to the student in a form which avoids a radical departure from the normal appearance of the keyboard, and hence avoids the introduction of distracting stimuli. By control of light intensity, a student may adjust the stimulus to comply with his need for reliance thereon. For example, as his proficiency increases and his reliance diminishes, the lamp intensity can be decreased to a point of only a subtle reinforcement of his mental determination of the appropriate key locations. Still further reduction of intensity eventually arrives at a point of only occasional reliance on the teaching device at all, the transformation from partial reliance to virtual independence being enhanced by the natural appearance of the indicator action on the key surface itself.

Further, the projected light beams serve to illuminate the finger of the student as it is brought into engagement with the proper key, i.e., a key having its indicator illuminated. Hence, the student is provided with an indication that his response is in compliance with the response solicited by the teaching device, and this indication is provided in advance of his commitment to sounding the instrument by depression of the key itself. Inasmuch as the surfaces 25 and 26 are uniform in nature despite their differences in elevation, the degree of illumination of the student's finger is substantially uniform for both white and black keys.

The foregoing description has been set forth as a specific example of a preferred embodiment of the invention, and is not to be interpreted in a limiting sense as defining the scope of the invention, which is set forth in the ensuing claims.

I claim:

1. A light bar for a keyboard teaching device comprising an elongated block for placement on a keyboard in a position overlying a plurality of individual keys and having a bottom surface configuration including portions in a first horizontal plane which portions correspond to the pattern of white keys on said keyboard, and portions alternating with said first named bottom portions and disposed in a second horizontal plane elevated from said first horizontal plane, the pattern of said elevated bottom portions corresponding to the pattern of black keys on said keyboard, said light bar further including a front surface for disposition facing a student, the portions of said front surface contiguous to said first named bottom portions occupying a first substantially vertical plane and portions contiguous to said elevated bottom portions occupying a second substantially vertical plane set back substantially from said first plane, the areas of transition between said front surface portions comprising side walls bordering said black keys and defining therebetween a pocket overlying said black key surfaces, light indicators overlying respective individual keys of said keyboard, said light indicators disposed in said front surface and oriented to project illumination downwardly onto the upper surface of the respective keys, said side walls serving to confine the projected illumination of light indicators overlying the black keys to the surface of the respective key.

2. A light bar indicator as set forth in claim 1 wherein the upper surface of the block slopes forwardly to intersect said first named portions of said front surface in junctures situated at a first elevation and to intersect said second named portions in junctures situated at a higher elevation, the angle of inclination of said sloping surface being such that the difference in elevations between said junctures is substantially equal to the difference in elevation between the upper surfaces of said white and said black keys, whereby said first and said second named front surface portions are of substantially uniform surface areas overlying both black and white keys.

* * * * *